United States Patent [19]
Smith et al.

[11] Patent Number: 5,778,545
[45] Date of Patent: Jul. 14, 1998

[54] MAGNETICALLY DAMPED AZIMUTH RESOLVER

[75] Inventors: Michael G. Smith, Richmond; James Howard Terhune, San Jose, both of Calif.; Roy C. May, Mooresville; George A. Romano, Charlotte, both of N.C.; Balasubramanian S. Kowdley, San Jose, Calif.

[73] Assignee: General Electric Company, San Jose, Calif.

[21] Appl. No.: 643,817

[22] Filed: May 6, 1996

[51] Int. Cl.$^6$ .............................. G01C 9/12; G01B 7/30
[52] U.S. Cl. .............................. 33/345; 33/300; 33/344
[58] Field of Search .............................. 33/345, 300, 301, 33/344, 401, 402

[56] References Cited

U.S. PATENT DOCUMENTS

| | | | |
|---|---|---|---|
| 2,803,887 | 8/1957 | Fry, Jr. | 33/345 |
| 3,975,831 | 8/1976 | Jysky et al. | 33/401 |
| 4,584,778 | 4/1986 | Komasaku et al. | 33/402 |
| 4,700,479 | 10/1987 | Saito et al. | 33/402 |

*Primary Examiner*—Christopher W. Fulton
*Attorney, Agent, or Firm*—James E. McGinness; Dennis M. Flaherty

[57] ABSTRACT

A means for damping a low-friction azimuth resolver by use of an array of small magnets acting on a metallic pendulum attached to the resolver shaft. The magnetic field acts on the pendulum motion to induce a motional electromotive force and associated currents, which produce forces opposed to the motion, thereby acting as a non-contact damper on the resolver shaft. When the resolver shaft is at rest, no "eddy currents" are produced in the static magnetic field and no damping force exists. If the shaft moves, the attached pendulum cuts the magnetic flux lines and produces a drag force proportional to the shaft angular speed. The pendulum is typically made of diamagnetic material, such as lead or copper, thereby assuring that the induced forces arise solely from the motion. The magnetic field is produced by an array of small, but intense, samarium-cobalt magnets contained in a compact package providing for uniform damping throughout 360° of resolver motion. The device is designed and constructed as a modification to standard resolvers and allows for application where tight clearances have previously been a constraint.

20 Claims, 4 Drawing Sheets

MAGNETICALLY DAMPED AZIMUTH RESOLVER

FIELD OF THE INVENTION

This invention generally relates to improving the dynamic response and accuracy of low-friction rotating devices. In particular, the invention relates to improving the dynamic response and accuracy of azimuth resolvers used as part of a remote ultrasonic inspection scanning mechanism.

BACKGROUND OF THE INVENTION

Azimuth resolvers have been used as part of remotely operated ultrasonic inspection scanning systems for nondestructive examination of circular cylindrical nuclear reactor components. As the scanner is moved around a pipe, nozzle, vessel, or other structure under-going inspection, a pendulous mass attached to the resolver shaft is acted upon by gravity at its center of mass to turn the resolver mechanism and produce an electrical signal proportional to the azimuthal distance traveled. The shaft rides on very-low-friction bearings, in order to achieve accuracy and sensitivity of the readout, but this has the disadvantage of under-damping the motion. Under-damping causes overshoot and oscillation of the resolver mechanism and the associated position signal, which is a very undesirable source of error. A means of additional damping is required which preferably does not contact the rotating elements of the resolver and also is "viscous". As used herein, the term "viscous" means that the damping effect is generally proportional to angular velocity.

In the ultrasonic inspection of welds in pressure vessels, piping, nozzles and other welded components, computerized motion control systems act in conjunction with computerized data acquisition systems. Accurate positional information is crucial to the successful collection of ultrasonic data and the proper operation of scanning equipment. Problems have arisen with angular resolvers used to provide azimuth information, principally due to the tendency of pendulums—required to provide a gravity-based reference—to oscillate following scanner movement. A related problem with these devices has been their lack of sensitivity to small incremental movements about nozzles and pipes. Both of these problem areas result in serious data errors, irregular indexing and occasional computer failure. In many cases, the motion computer provides no means of detecting that a problem exists with the resolver data, which is a serious issue in the credibility of test data. Pendulum oscillation has been a major drawback to system performance, since excessive or prolonged oscillation during scanner indexing renders positional information useless when precise control is crucial.

Prior approaches to solving these problems have involved software intended to alleviate the effects of oscillation, various attempts at frictional dampers and pendulum motion feedback controllers relying on odometer wheels for closed loop motion control. Various mechanical design variations of the pendulum mass, shape, and configuration have all led to only marginal improvements. Fluid damping has been tried, but required more space than was available in miniature resolvers. Attempts to increase the fluid mass failed because of reduction in angular sensitivity. Some electronic damping devices are quite small and sensitive, but do not provide for full 360-degree azimuth capability, as is often required. It has become clear from this prior art that a non-contact, negative feedback method proportional to pendulum speed is required to address the basic cause of these problems: under-damped angular motion of the pendulum.

SUMMARY OF THE INVENTION

The present invention is a means for damping a low-friction azimuth resolver by use of an array of small magnets acting on a metallic pendulum attached to the resolver shaft. The magnetic field acts on the pendulum motion to induce a motional electromotive force and associated currents, which produce forces opposed to the motion, thereby acting as a non-contact damper on the resolver shaft. When the resolver shaft is at rest, no "eddy currents" are produced in the static magnetic field and no damping force exists. If the shaft moves, the attached pendulum cuts the magnetic flux lines and produces a drag force proportional to the shaft angular speed. The pendulum is preferably made of diamagnetic material, such as lead or copper (as used herein, the term "copper" includes copper alloy or copper metal), thereby assuring that the induced forces arise solely from the motion. The magnetic field is produced by an array of small, but intense, samarium-cobalt magnets contained in a compact package providing for uniform damping throughout 360 degrees of resolver motion. The device is designed and constructed as a modification to standard resolvers and allows for application where tight clearances have previously been a constraint.

The magnetically damped angular resolver in accordance with the invention provides means for suppressing undesirable oscillations in angular readout without sacrificing sensitivity. It utilizes pendulum material magnetic properties in synergistic combination with geometrical, magnetic field and mass characteristics to optimize damped response. A further aspect of the invention is the employment of magnetic and non-magnetic materials in combination to enhance magnetic field strength and shape such that damping is beneficially enhanced. The magnetically damped angular resolver in accordance with the invention has a compact, rugged, reliable design without the need for bulky, unreliable and ineffective damping devices or software, which are conventional in the art. The invention is an inherently reliable device with few failure modes and capable of providing rapid, accurate azimuth readout over 360° of orientation.

The magnetically damped angular resolver in accordance with the invention has application in the nondestructive examination of structural members and components of complex shapes. Due to its small size, high sensitivity and reliability, the device is suitable for any remotely operated vehicle application where orientation is a concern, or in any application where sensitivity to small angular displacements is promptly required with high accuracy. The orientation readout is unaffected by power loss and recovery, meaning that orientation is immediately known when power is restored to the system. Because of its noise immunity, the device may be applicable in remote welding applications, as well as other remotely controlled equipments of a wide variety.

DETAILED DESCRIPTION OF THE PREFERRED EMBODIMENTS

The basic principles of magnetic damping are known to the art, but usually require large, bulky magnets and heavy pendulums made of dense magnetic materials. Such schemes are impractical for miniature resolvers and the like. Azimuthal sensitivity requires a small pendulum with very-low-friction bearings and small end loads on the shaft. Thus, starting torque is reduced and the resolver is very sensitive to small angular changes. But without an external damper, severe and prolonged oscillation has been encountered.

In accordance with the present invention, a non-contact and "viscous" external damper is provided by the use of a static magnetic field of the proper length and configuration. In order to better understand the principle of operation, a brief review of the physical phenomena employed is provided.

When a conducting material is moved through a static magnetic field, its surfaces cut through the magnetic flux, thereby inducing an electromotive force in the material (Faraday's Law). Current flows, because of the conductivity of the material (Ohm's Law), and it produces a force (the Lorentz force) which is equal to the vector product of current with the imposed magnetic flux density. If the conductivity is relatively high, the induced current is confined to the surface of the moving material. In any case, the volumetric body force on the moving conductor is:

$$\vec{F} = \vec{j} \times \vec{B} \tag{1}$$

where j is the induced current density; B is the flux density; and F is the force per unit volume of material. The vector product in Eq. (1) means that F, j and B are orthogonal to each other. The sense or direction of F is also implied by the vector product and is always opposed to the motion that produces j (Lenz's Law). In the present case, it is a retarding force. The Lorentz force is a variable body force proportional to the speed with which the conducting volume crosses the B-field lines. It results in an integrated torque opposing the rotational motion. These are ideal properties for a damping mechanism, but it is not obvious how to configure a device, or design it, for use with very small rotating members like angular resolvers, because of the nonlinearity of the damping mechanism and its vector character.

Figure 1:
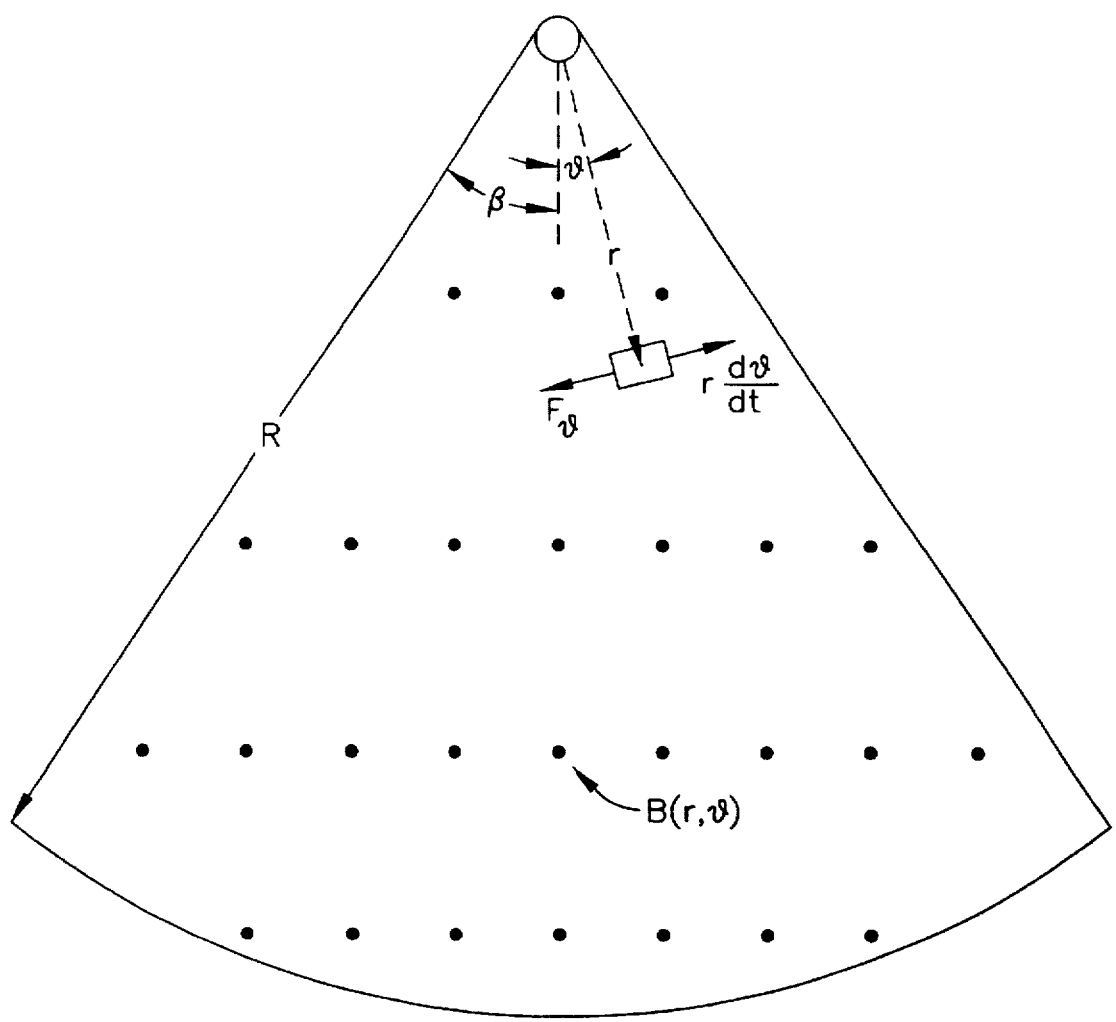
FIG. 1 is a schematic diagram of idealized magnetic damping of a permeable pendulum.

To illustrate the damping mechanism, an incremental volume of material of conductivity σ is oriented as shown in FIG. 1 with respect to a variable B-field, depicted by dots. The shaded incremental volume of depth h has a counterclockwise angular velocity about the center of rotation (+). The pendulum is a sector of a cylinder, and the polar half-angle is β. The slant-height is R, which is the radius of the pendulum base.

The induced current density is given by the vector product:

$$\vec{j} = \sigma \vec{v} \times \vec{B} = \sigma r d\theta/dt \; (-B_r \hat{z} + B_z \hat{r}) \tag{2}$$

where the carat indicates a unit vector. The induced current has spatially varying radial and axial components and oscillates in sign as the angular velocity oscillates back and forth.

The torque T on the volume element is clockwise in FIG. 1 and also oscillates. In the preferred configuration, the B-field possesses azimuthal symmetry. In this case, Eqs. (1) and (2) determine the integrated moment opposing the motion, which is given by:

$$T = -\sigma 2\beta \frac{d\upsilon}{dt} \int_0^R \int_0^h B_0^2(r,z) r^3 dr dz \tag{3}$$

The sign of T is positive for clockwise moment and negative for counterclockwise moment about the axis of rotation. Since B(r,z) is difficult to describe in mathematical form, the integrals in Eq. (3) cannot be evaluated exactly. However, in non-dimensional form, Eq. (3) reduces to:

$$T = -\sigma 2\beta h l B_0^2 l R^4 \frac{d\upsilon}{dt} \int_0^1 \int_0^1 f(x,y) x^3 dx dy \tag{4a}$$

$$T \propto -\sigma 2\beta h l B_0^2 l R^4 \frac{d\upsilon}{dt} \tag{4b}$$

where $x=r/R$, $y=z/h$ and $B_0^2(X,z)=|B_0^2|f(x,z)$. The integrated moment is proportional to the angular speed, and the proportionality is a complicated function of angles, dimensions and the magnetic source strength $B_0$. The numerical factor that converts Eq. (4b) to an equation must be determined empirically, in general.

The pendulum motion can be described by summing moments about the rotational axis, including the integrated torque and the gravitational force acting on the center of mass of the pendulum. The moment of inertia I times the angular acceleration is then equated to the sum of moments to describe the angular motion:

$$\Sigma M = I \; d^2\theta/dt^2 \tag{5}$$

If the pendulum is given a sudden displacement from equilibrium, it eventually comes to rest at a displacement angle $\theta_f$ with respect to its initial position. In this case, Eq. (5) becomes:

$$\frac{d^2\upsilon}{dt} + 2\xi\omega_0 \frac{d\upsilon}{dt} + \omega_0^2 (\upsilon - \upsilon_f) = 0 \tag{6}$$

where $$\omega_0^2 = \frac{Lmg_0}{I} \; ; \; \xi = \frac{C}{2I\omega_0} + \xi_0$$

Figure 2:
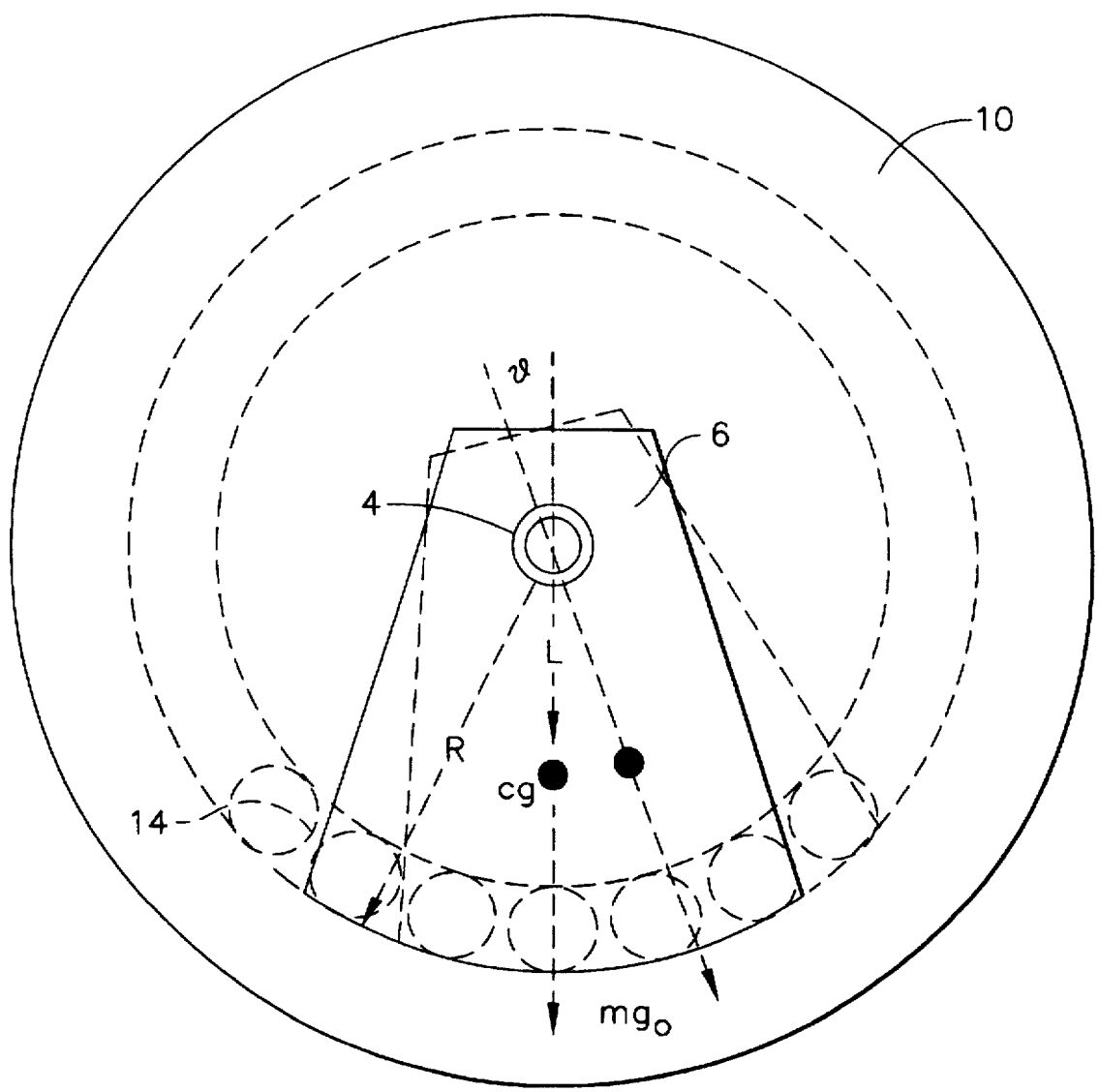
FIG. 2 is a schematic diagram showing an end view of a permeable pendulum on an angular resolver shaft.

C is a proportionality factor given by Eq. (4); L is the radial distance from the center of mass to the axis of rotation; and m is the mass of the pendulum. The moment of inertia I includes all of the rotating members, including the shaft and resolver internals. $\omega_0$ is the undamped natural frequency of the rotating members; and ξ is the damping ratio due to the magnetic field and mechanical friction ($\xi_0$). The physical picture of the damped system is depicted in end view in FIG. 2. The B-field lines are in the plane perpendicular to the page and originate from the array of small magnets shown as dotted circles surrounding the lower portion of the pendulum.

Figure 3:
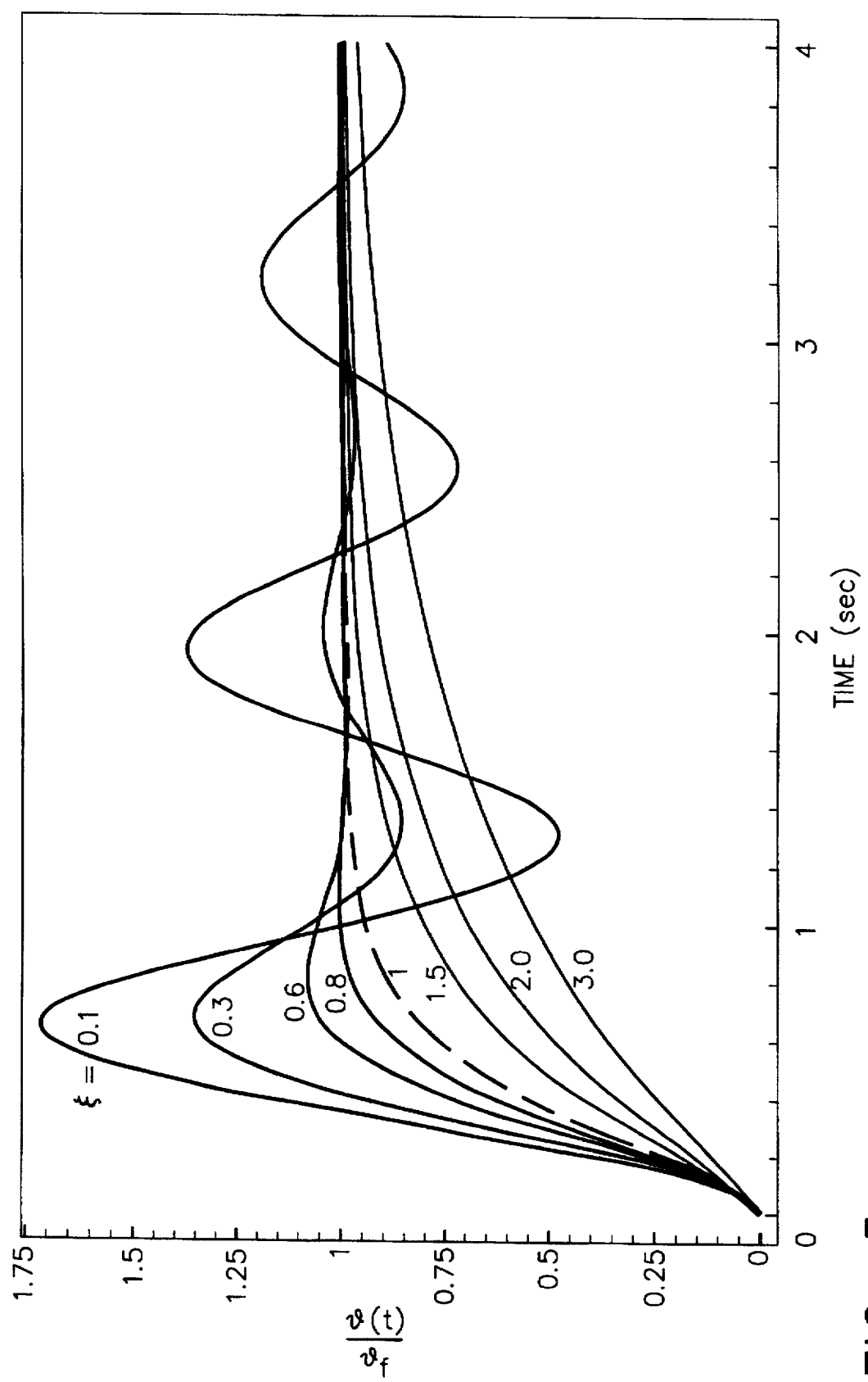
FIG. 3 is a graph of the damped pendulum response $\theta(t)/\theta_f$ as a function of time showing the typical regimes of motion for a damped angular resolver.

Equation (6) is nonlinear because of the sine term in the forcing function (third term). However, for angular displacements less than π/4, the equation of motion can be approximated by setting sin θ≈θ, which allows for an analytical solution. The result is a function of ξ and $\omega_0$ and displays regimes of motion: underdamped, critically damped and overdamped. A typical case is calculated numerically without the linearization in FIG. 3, which clearly displays the damping regimes. For ξ<1, the motion is damped oscillation and takes many cycles to damp out for small ξ. For ξ>1, the motion is not oscillatory, but is slow to reach equilibrium as $\xi$ increases. For $\xi \approx 1$ (dashed curve), the motion is critically damped, but equilibrium is reached in the shortest time for $\xi=0.8$. This is the most desirable state of motion for resolver accuracy and stability. The optimum performance occurs when the parameters C, I and $\omega_0$ are related such that:

$$\frac{4\sqrt{ILmg_0}}{5\sigma\beta hlB_0^2lR^4} = \int_0^1\int_0^1 f(x,y)x^3 dx dy \qquad (7)$$

Therefore, by adjusting the pendulum mass, material and shape, and the strength and shape of the magnetic field, rapid response and monotonic motion can be achieved by implementing the condition of Eq. (7).

In accordance with the preferred embodiment of the present invention, the addition of an array of small, powerful permanent magnets and external means of tailoring the shape and strength of their combined fields provides a retarding body force of magnetic origin, only when the pendulum is in motion. The integrated torque due to this force distribution can be adjusted, with the aid of Eq. (7) above, to approach the optimum damping for a small diamagnetic pendulum, thereby reducing or entirely eliminating oscillation, while retaining angular sensitivity. The damping ratio can be trimmed using a small conducting disc affixed to the rotating shaft and located near the magnet array. At the same time, a compact, rugged design can be conceived of with high reliability, that is field serviceable with minimum downtime and replacement costs.

Figure 5:
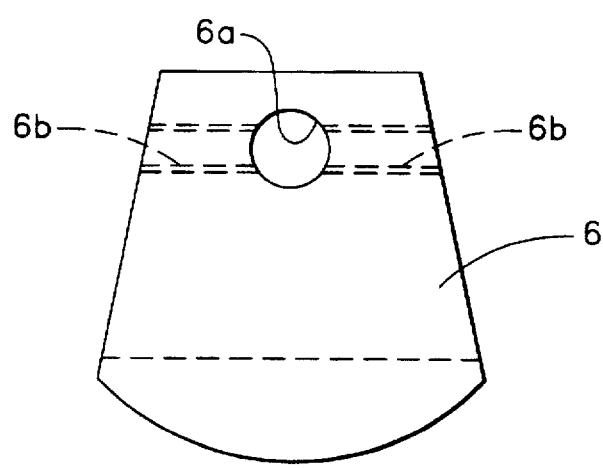
FIG. 5 is a schematic diagram showing a front view of the pendulum incorporated in the angular resolver depicted in FIG. 4A.
Figure 4A:
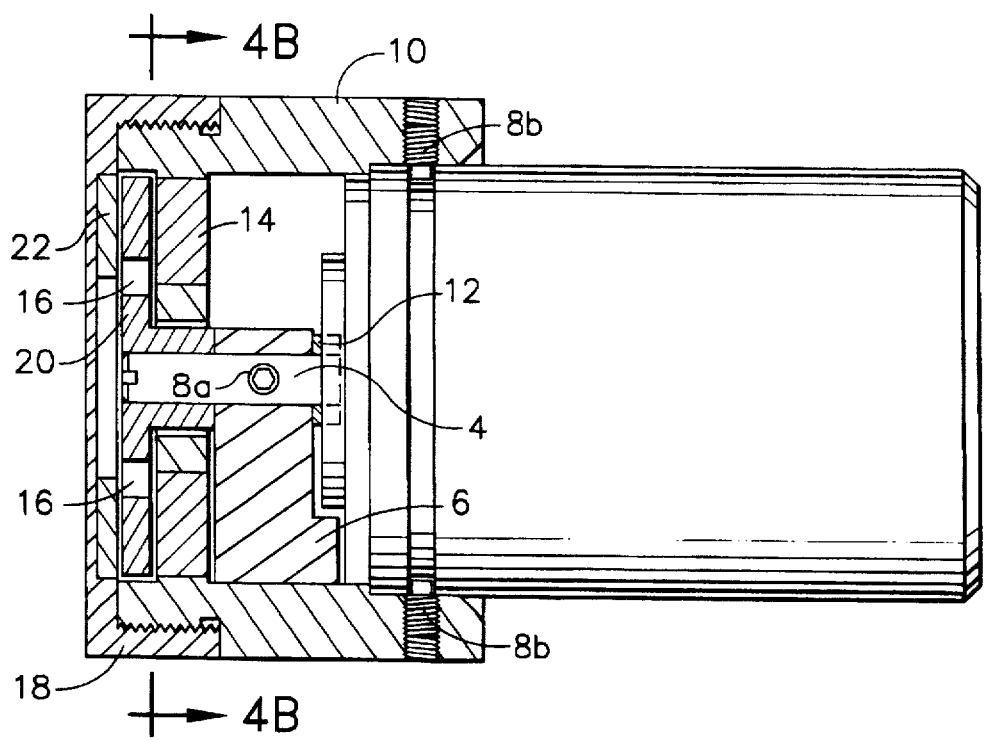
FIGS. 4A and 4B are schematic diagrams showing sectional and end views, respectively, of an angular resolver in accordance with the preferred embodiment of the invention.
Figure 4B:
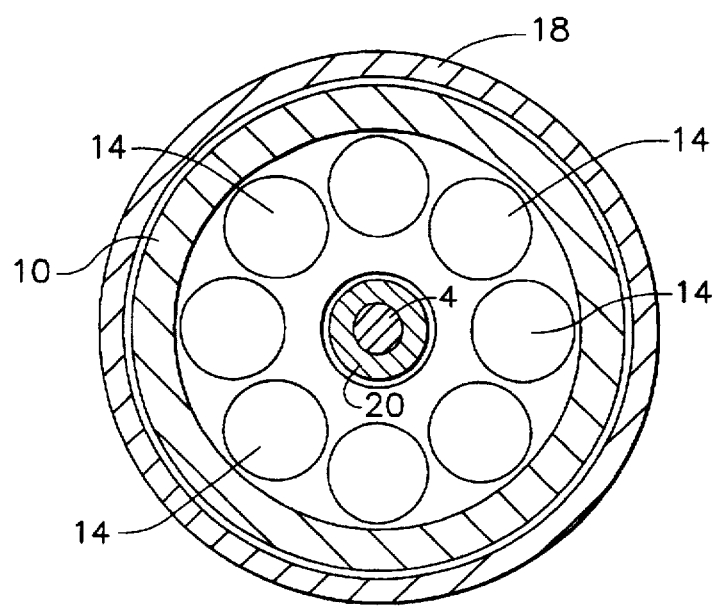

Referring to FIGS. 4A and 4B, a brushless resolver, such as Clifton Precision Model 11BHW-36TK-F830, comprises a housing 2 having bearing means (not shown) for rotatably supporting a low-friction rotating shaft 4. A pendulum 6, made of lead or copper, is attached to the resolver shaft 4 by means of set screws 8a. As shown in FIG. 5, the pendulum 6 has a circular cylindrical unthreaded bore 6a which receives the shaft 4 and a pair of threaded bores 6b which receive respective set screws 8a. The threaded bores 6b are coaxial and intersect the bore 6a at right angles on opposite sides thereof.

A spacer 12 is arranged between the housing 1 and the pendulum 6. A magnet housing 10, typically made of aluminum or LUCITE, is attached to the resolver housing 2 by means of set screws 8b. The magnet housing 10 has a generally circular cylindrical portion and a magnet support ring portion extending radially inward near the distal end of the generally circular cylindrical portion. The generally circular cylindrical portion of magnet housing 10 has an inner diameter slightly greater than the distance between the axis of shaft 4 and the point on pendulum 6 which is furthest away from the shaft axis. The magnet housing 10 is coaxial with shaft 4 so that magnet housing 10 can rotate freely around the pendulum 6, which hangs substantially stationary under the influence of gravity.

In accordance with the preferred embodiment of the invention, the azimuth resolver contains a non-uniform magnetic field created by an array of samarium-cobalt magnets 14 which fit into corresponding holes in the magnet support ring portion of magnet housing 10. As best seen in FIG. 4B, each magnet 14 is a circular disk of predetermined radius. These magnets are preferably arranged in a circular array, i.e., the centers of each circular disk lie along a pitch circle and are spaced at equiangular intervals, e.g., eight magnets spaced at 45° intervals. The strength of each magnet is typically 2 to 3 kilogauss.

The shape and intensity of the magnetic field produced by the magnets 14 are tailored by an aluminum, copper or silver-plated aluminum disc 20 (as used herein, the term "aluminum" includes aluminum alloy or aluminum metal) and a soft iron (e.g., mild steel) annular disk 22. Disc 20 has an integral sleeve which is press-fitted fitted onto the shaft 4. Two apertures 16 are provided along a diameter of disc 20 for insertion of two dowel pins of a tool for removing the press-fitted disk from shaft 4. The annular disk 22 is secured, e.g., using adhesive material, in a recess formed in an end cap 18. The end cap has a circular cylindrical wall which is threaded on the inside for threaded coupling with a threaded outer surface on the distal end of the magnet housing 10.

In accordance with the preferred embodiment, the disk 20 is made of copper and the pendulum 6 is made of lead. The magnetic field acts on the pendulum 6 and on the conducting disc 20 to damp oscillations of the pendulum resulting from a shift in the center of gravity following an angular displacement of the magnet housing 10 relative to the stationary pendulum 6.

The mechanical assembly, employing spacer 12, housing 2 and end cap 18 is designed to place the magnets 14 in close proximity to the pendulum 6 and the conducting disc 20, but without contact, to allow free 360° motion of the pendulum and conducting disc, if required. The mild steel disk 22 held in end cap 18 serves as a "pole piece" to homogenize and shift the magnetic field slightly away from the conducting disc 20. This favors damping by increasing $B_0$ through the presence of the induced magnetization in the iron. Fabricating the end cap from polished LUCITE provides visual access for directly observing angular deflection when the resolver is rotated.

The magnet housing 10 has a small bevel on the resolver end to allow the application of a small bead of silicone sealant to prevent intrusion of dust, dirt, water or other foreign material that might interfere with the close tolerances of the mechanism. The assembled device, when installed into a scanning mechanism (not shown) and electrically connected, provides precise azimuth position readout to a motion control system (not shown), which acts in conjunction with the ultrasonic data acquisition system (not shown) to move the scanner around a nozzle, pipe, vessel or other complicated structural member undergoing inspection.

The preferred embodiment has been disclosed for the purpose of illustration only. Variations and modifications of that embodiment will be readily apparent to persons skilled in the design of angular resolvers. All such variations and modifications are intended to be encompassed by the claims appended hereto. As used in the claims, the term "pendulum assembly" means all of the elements of the azimuth resolver which rotate in unison, e.g., rotating shaft 4, pendulum 6 and disc 20.

We claim:

1. A magnetically damped angular resolver comprising:

a resolver housing;

a shaft having first and second end sections and an intermediate section between said first and second end sections said first end section being rotatably mounted to said resolver housing for rotation relative to said resolver housing about an axis, and said intermediate section and said second end section being located outside said resolver housing;

a conducting pendulum secured to said intermediate section of said shaft for rotation therewith, said pendulum being made of electrically conductive material;

a conducting disc secured to said second end section of said shaft for rotation therewith and oriented substantially perpendicular to said axis, said conducting disc being made of electrically conductive material;

a first magnet located outside said resolver housing;

a magnet support structure for supporting said first magnet in proximity to said conducting disc, wherein said magnet support structure is connected to and extends outside said resolver housing, and said first magnet induces eddy currents in said conducting disc during relative rotation of said shaft and said resolver housing such that said eddy currents produce a torque which opposes said relative rotation.

2. The magnetically damped angular resolver as defined in claim 1, further comprising an end cap connected to said magnet support structure.

3. The magnetically damped angular resolver as defined in claim 2, further comprising a pole piece supported by said end cap in spaced relationship to said first magnet with said conducting disc therebetween.

4. The magnetically damped angular resolver as defined in claim 3, wherein said pole piece is made of iron alloy.

5. The magnetically damped angular resolver as defined in claim 1, wherein said first magnet is made of samarium-cobalt alloy.

6. The magnetically damped angular resolver as defined in claim 1, further comprising a second magnet supported by said magnet support structure.

7. The magnetically damped angular resolver as defined in claim 6, wherein said first and second magnets lie in a plane perpendicular to said axis of rotation of said shaft.

8. The magnetically damped angular resolver as defined in claim 1, wherein said conducting disc is made of copper alloy.

9. The magnetically damped angular resolver as defined in claim 1, wherein said conducting disc is made of aluminum alloy.

10. The magnetically damped angular resolver as defined in claim 1, wherein said conducting disc is plated with silver.

11. A magnetically damped angular resolver comprising:

a resolver housing;

a shaft rotatably mounted in said resolver housing for rotation relative to said resolver housing about an axis;

a conducting pendulum secured to said shaft for rotation therewith, said pendulum being made of electrically conductive material;

a conducting disc secured to said shaft for rotation therewith and oriented substantially perpendicular to said axis, said conducting disc being made of electrically conductive material;

a plurality of magnets;

a magnet support structure for supporting said plurality of magnets in a plane perpendicular to said axis of rotation of said shaft and in proximity to said conducting disc, wherein said magnet support structure is connected to said resolver housing, and said plurality of magnets induce eddy currents in said conducting disc and conducting pendulum during relative rotation of said shaft and said resolver housing such that said eddy currents produce a torque which opposes said relative rotation.

12. The magnetically damped angular resolver as defined in claim 11, further comprising an end cap connected to said magnet support structure.

13. The magnetically damped angular resolver as defined in claim 12, further comprising a pole piece supported by said end cap in spaced relationship to said plurality of magnets with said conducting disc therebetween.

14. The magnetically damped angular resolver as defined in claim 11, wherein each of said plurality of magnets is a circular disk of magnetic material.

15. The magnetically damped angular resolver as defined in claim 11, wherein said magnet support structure comprises a ring having a plurality of holes for receiving said plurality of magnets.

16. The magnetically damped angular resolver as defined in claim 11, wherein said pendulum is made of lead and said conducting disc is made of copper alloy.

17. A method for designing a magnetically damped angular resolver having a pendulum assembly incorporating elements made of electrically conductive material, and at least one magnet for producing a magnetic field, comprising the steps of adjusting the mass, material and shape of the pendulum assembly, and the strength and shape of the magnetic field to satisfy the following equation:

$$\frac{4\sqrt{ILmg_0}}{5\sigma\beta h l B_0^2 l R^4} = \int_0^1 \int_0^1 f(x,y) x^3 dx dy$$

wherein I is the moment of inertia of the pendulum assembly; L is the distance from the axis of rotation to the pendulum assembly center-of-mass; m is the mass of the pendulum assembly; $g_0$ is the gravitational acceleration; $\sigma$ is the electrical conductivity of the conductive material; $\beta$ is the polar half-angle of the pendulum assembly; h is the pendulum depth; $B_0$ is the magnetic source strength; R is the slant height of the pendulum assembly; x=r/R; y=z/h; and $B_0^2(x,z)=|B_0^2|f(x,z)$.

18. A magnetically damped angular resolver having a pendulum assembly incorporating elements made of electrically conductive material, and at least one magnet for producing a magnetic field, wherein the mass, material and shape of the pendulum assembly, and the strength and shape of the magnetic field satisfy the following equation:

$$\frac{4\sqrt{ILmg_0}}{5\sigma\beta h l B_0^2 l R^4} = \int_0^1 \int_0^1 f(x,y) x^3 dx dy$$

wherein I is the moment of inertia of the pendulum assembly; L is the distance from the axis of rotation to the pendulum assembly center-of-mass; m is the mass of the pendulum assembly; $g_0$ is the gravitational acceleration; $\sigma$ the electrical conductivity of the conductive material; $\beta$ is the polar half-angle of the pendulum assembly; h is the pendulum depth; $B_0$ is the magnetic source strength; R is the slant height of the pendulum assembly; x=r/R; y=z/h; and $B_0^2(x,z)=|B_0^2|f(x,z)$.

19. The magnetically damped angular resolver as defined in claim 18, wherein said conductive material is copper.

20. The magnetically damped angular resolver as defined in claim 18, wherein said at least one magnet is made of samarium-cobalt alloy.

* * * * *